United States Patent
Li

(10) Patent No.: US 8,103,161 B2
(45) Date of Patent: Jan. 24, 2012

(54) METHOD, DEVICE AND SYSTEM FOR GROUP OPTICAL CHANNEL SHARED PROTECTION

(75) Inventor: Congqi Li, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 992 days.

(21) Appl. No.: 11/813,143

(22) PCT Filed: Dec. 31, 2005

(86) PCT No.: PCT/CN2005/002428
§ 371 (c)(1),
(2), (4) Date: Sep. 12, 2007

(87) PCT Pub. No.: WO2006/069551
PCT Pub. Date: Jul. 6, 2006

(65) Prior Publication Data
US 2009/0123146 A1    May 14, 2009

(30) Foreign Application Priority Data
Jan. 1, 2005 (CN) .......................... 2005 1 0005442

(51) Int. Cl.
*G02F 1/00* (2006.01)

(52) U.S. Cl. ......... 398/4; 398/3; 398/5; 398/59; 398/83; 370/222; 370/223; 370/227; 370/228; 370/535; 385/24; 385/16; 385/17; 385/18

(58) Field of Classification Search ............... 398/3, 5, 398/7, 8, 4, 59, 83, 79, 17, 19, 34, 45, 47, 398/48, 1, 2, 84, 75, 87, 10, 13, 22, 23, 24, 398/30, 31, 33; 370/222, 223, 224, 225, 370/226, 227, 228, 535, 536, 537, 242, 248, 370/241; 385/24, 16, 17, 18, 37
See application file for complete search history.

(56) References Cited

U.S. PATENT DOCUMENTS
6,243,512 B1    6/2001  Rettenberger et al.
(Continued)

FOREIGN PATENT DOCUMENTS
CN    1416232    5/2003
(Continued)

OTHER PUBLICATIONS

Extended European Search Report, PCT/CN2005/002428, Apr. 12, 2011, Applicant Huawei Technologies Co., Ltd., 7 pages.

(Continued)

*Primary Examiner* — Hanh Phan
(74) *Attorney, Agent, or Firm* — Slater & Matsil, L.L.P.

(57) ABSTRACT

The present invention discloses a method and system for group optical channel shared protection. In the invention, when a failure occurs, operations are performed on an optical wavelength group, and four actions are accomplished at the time of switching: switching the affected optical wavelength group on the working fiber to a backup fiber (Steer); switching the optical wavelength group whose destination node is the current node on the backup fiber to the working fiber (Copy); making the optical wavelength group whose destination node is not the current node on the backup fiber transparently pass through the current node (Pass Through); and blocking or stripping the backup wavelength group transferred on the backup fiber (Strip). In addition, the invention further discloses a plurality of node structures for realizing the above operations.

32 Claims, 6 Drawing Sheets

U.S. PATENT DOCUMENTS

| | | |
|---|---|---|
| 6,414,765 B1 | 7/2002 | Li et al. |
| 6,493,117 B1 * | 12/2002 | Milton et al. ............... 398/49 |
| 6,771,852 B2 | 8/2004 | Hemenway et al. |
| 6,847,607 B1 | 1/2005 | Kasdan |
| 6,895,186 B2 | 5/2005 | Stern |
| 6,898,376 B1 | 5/2005 | Gerstel et al. |
| 6,968,102 B2 | 11/2005 | Tochio et al. |
| 7,123,830 B2 * | 10/2006 | Kim et al. ................. 398/3 |
| 7,133,609 B2 * | 11/2006 | Kim et al. ................. 398/3 |
| 7,280,754 B2 | 10/2007 | Doh et al. |
| 7,330,650 B2 * | 2/2008 | Kim et al. ................. 398/4 |
| 7,787,763 B2 | 8/2010 | Gumaste et al. |
| 7,796,502 B2 | 9/2010 | Li |
| 7,817,918 B2 | 10/2010 | Guild |
| 2002/0080443 A1 | 6/2002 | Stern |
| 2004/0042795 A1 | 3/2004 | Doerr et al. |
| 2004/0076426 A1 | 4/2004 | Doh et al. |
| 2005/0175277 A1 | 8/2005 | Tochio et al. |
| 2006/0013586 A1 | 1/2006 | Pichler et al. |
| 2006/0127088 A1 | 6/2006 | Guild |
| 2006/0222360 A1 | 10/2006 | Gumaste et al. |
| 2007/0195693 A1 | 8/2007 | Li |
| 2008/0292310 A1 * | 11/2008 | Li ........................ 398/5 |
| 2009/0123146 A1 | 5/2009 | Li |

FOREIGN PATENT DOCUMENTS

| | | |
|---|---|---|
| CN | 1416234 | 5/2003 |
| CN | 1492602 | 4/2004 |
| CN | 1494250 | 5/2004 |
| CN | 1529450 | 9/2004 |
| CN | 1549488 | 11/2004 |
| CN | 1666564 | 9/2005 |
| CN | 1684381 | 10/2005 |
| CN | 1847893 | 10/2006 |
| EP | 0949777 | 10/1999 |
| EP | 1411666 | 4/2004 |
| WO | 2004079950 | 9/2004 |

OTHER PUBLICATIONS

Bing, Y., "Multiplex Section Shared Protection Ring on Optical Transport Net", Sep. 2001, Telecommunications Science, Beijing, China, 4 pages.

Extended European Search Report, PCT/CN2006/003556, Apr. 12, 2011, Applicant Huawei Technologies Co., Ltd., 6 pages.

Chinese Office Action, 200510131991.8, Jan. 25, 2008, 10 pages (with partial English translation).

Grobe, K., et al., "Optical metropolitan DWDM networks-an overview", Oct. 2002, BT Technology Journal, XP-001141714, 18 pages.

Russian Office Action, 2008127908/09(034324), Aug. 11, 2009, 10 pages (with English translation).

International Search Report, PCT/CN2006/003556, Apr. 2, 2007, 6 pages.

* cited by examiner

METHOD, DEVICE AND SYSTEM FOR GROUP OPTICAL CHANNEL SHARED PROTECTION

FIELD OF THE INVENTION

The present invention relates to optical communication technologies, in particular, to the fiber failure protection of an optical network in optical communications.

BACKGROUND OF THE INVENTION

With the development of communication technologies, the reliability of communications becomes more and more important. One important influencing factor of the reliability of communications is network survivability. The network survivability refers to the capability of a network to maintain an acceptable QoS level during a network failure or an equipment failure. The main technical indices for characterizing the network survivability includes: redundancy, restore rate and restore time. The redundancy is defined as the ratio of the total idle capacity to the total working capacity of a network, which is mainly used for measuring the extra cost the system needs to pay for improving the survivability. The restore rate refers to the ratio of the number of restored channels to the total number of the originally failed channels, or the ratio of the restored capacity to the total capacity failed originally. The restore time refers to the time the network needs to expend to recover a failed service.

In the field of communications, the requirements to the restore time of a failure in different services are totally different. Generally, the ATMs (Automatic Teller Machines) of a large financial institution and a bank have the strictest requirements to the service restore time, usually less than 50 ms; ordinary communication services have relatively higher bearing capability on the service interruption time, but usually no longer than 30 minutes. These services are transferred on an optical network after being processed by a switch or a router. Usually, when the interruption time of a transport network is between 50 and 200 ms, the probability of losing the connection of switching service is less than 5%, and the influence to the No. 7 signaling network and cell relay service basically can be ignored. When the interruption time of the transport network is increased to 200 ms~2 s, the probability of losing the switching service increases gradually. When the interruption time of the transfer network exceeds 2 s, most of the circuit switch connections, private lines and dialing services will be lost. When the interruption time of the transfer network reaches 10 s, the connection of all the communication sessions will be lost. If the interruption time of the transfer network exceeds 5 minutes, severe switch block will be caused, and the upper layer service will not be restored in a longer time.

Optical communication technologies develop rapidly in the field of communications currently, especially the advancement of optical devices boosts the development of optical communication technologies greatly. The transmission capacity is doubled every 9 months on the average, which is twice of the rate defined by Moore's Law. WDM (Wavelength Division Multiplexing) technology is a preferred technology for implementing high-speed and large-capacity transmission. At present, with the development of WDM technology, the communication capacity carried on a single fiber may reach Tbps level. In such a case, the fiber line failure or equipment failure on the bottom-layer optical network may usually affect a lot of services. As a result, it has become a focus to the carriers and the equipment vendors that how to improve the network survivability of the optical communication network.

WDM technologies become more and more mature with time, and its networking mode has developed from the back-to-back chain connection to the ring network and mesh network. The metropolitan area WDM is usually networked in the ring network mode. The SDH (Synchronous Digital Hierarchy) Ring Network provides protection modes such as: UPSR (Unidirectional Path Switching Ring), BPSR (Bidirectional Path Switching Ring), ULSR (Unidirectional Line Switching Ring), BLSR (Bidirectional Line Switching Ring) and SNCP (Sub-Network Connection Protection), etc. The WDM system provides similar protection modes such as: OUPSR (Optical Unidirectional Path Switching Ring), OBPSR (Optical Bidirectional Path Switching Ring), OULSR (Optical Unidirectional Line Switching Ring), OBLSR (Optical Bidirectional Line Switching Ring), OSNCP (Optical Sub-Network Connection Protection) and OCh-SPRing (Optical Channel Shared Protection Ring).

The so-called "Optical Channel Shared Protection" means that the bidirectional service connections on different segments of a ring share the same pair of wavelengths $\lambda 1$ and $\lambda 2$, which exist on two different fibers respectively. Meanwhile, the corresponding $\lambda 2$ and $\lambda 1$ on the two fibers are used as the protection wavelength for the working wavelength $\lambda 2$ and $\lambda 1$. Because the bidirectional service connections on different spans may share the same pair of wavelengths as the protection wavelengths, such a protection mode is referred to as the optical channel shared protection.

For a node that participates in the optical channel shared protection, three operations should be supported: service Pass Through, service add and service drop. The service Pass Through means that the protection service of other sites may pass through on this site directly, so that the protection service may be delivered to its destination node correctly. The service add means that the local service may be correctly switched to a backup channel for transmission when the local service is affected. The service drop means that a service with the local destination may be delivered to the local destination via a backup channel when the working channel is affected by a failure, and the service on the backup channel may be locally led to a receiver correctly.

In order to realize the above three operations on the node, in a usual optical channel shared protection method, a pair of wavelengths are first separated via an OADM (Optical Add Drop Multiplexer), and then the pair of wavelengths are processed in an optical channel shared protection switching device. FIG. 1 is a schematic diagram showing the internal structure of an existing optical channel shared protection node. Wherein, letter W refers to the working wavelength, letter P refers to the protection wavelength, letter D refers to the dropped service, and letter A refers to the added service, wherein the working wavelength and protection wavelength are distinguished by solid lines and dashed lines.

A usual method for implementing the optical channel shared protection will now be illustrated in conjunction with FIG. 1. In a typical existing optical channel shared protection node shown in FIG. 1, each wavelength may be configured as follows: the west-oriented outer fiber wavelength W11 employs wavelength 1 as the working wavelength, while the west-oriented inner fiber wavelength W21 employs wavelength 2 as the working wavelength. The east-oriented outer fiber wavelength W12 employs wavelength 1 as the working wavelength, while the east-oriented inner fiber wavelength W22 employs wavelength 2 as the working wavelength. Meanwhile, the west-oriented outer fiber wavelength P22 employs wavelength 2 as the protection wavelength of W22, the west-oriented inner fiber wavelength P12 employs wavelength 1 as the protection wavelength of W12, the east-oriented outer fiber wavelength P21 employs wavelength 2 as the protection wavelength of W21, and the east-oriented inner fiber wavelength P11 employs wavelength 1 as the protection wavelength of W11. Thus, a pair of wavelengths is shared by the bidirectional services on two segments of the fiber connected via the node, so that the optical channel shared protection may be realized. It can be seen that in this technical solution, a plurality of services on different segments may employ the same wavelength. In other words, a backup wavelength may be shared by a plurality of services on different segments, and the protection may be realized. Therefore, it is called the optical channel shared protection. In the node, after the wavelength pair is demultiplexed from the east and west line via an OADM, the wavelength pair can only be multiplexed again via an OADM and sent out in east and west line after being processed by an optical channel shared protection switching unit. The service add and service drop are also accomplished via the optical channel shared protection switching unit, wherein, the node shown in FIG. 1 accomplishes the add of the service A2 and the drop of the service D1 on the outer fiber, and accomplishes the add of the service A1 and the drop of the service D2 on the inner fiber. When a failure occurs on a certain segment of the fiber or on a node of the ring, the receiving end automatically switches to select and receive the signal from the other direction after the receiving end detects that the signal from one direction is lost. For example, when a failure occurs on the west-oriented outer fiber of the node shown in FIG. 1, the OADM automatically switches to receive the signal (P11) from the east-oriented inner fiber when the OADM detects that the outer fiber signal (W11) to be received from west is lost, wherein P11 acts as the protection wavelength of W11. Thus, the service protection may be realized.

In the above optical channel shared protection, a pair of wavelengths are taken as a basic unit. First of all, the wavelength pair is demultiplexed from the east and west lines via the OADM, then the wavelength pair is processed by an optical channel shared protection switching unit, and finally the wavelength pair is multiplexed again via the OADM and sent out in the east and west line. The disadvantage of the solution lies in that: when on a ring the optical channel shared protection needs to be implemented for a plurality of wavelength pairs at the same time, the corresponding OADM site and optical channel shared protection unit need to be arranged for each wavelength pair. Thus, the cost and complexity of the optical channel shared protection will be increased greatly.

To overcome the inconveniences in the process for realizing the optical channel shared protection and to achieve a protection of higher efficiency, a plurality of wavelengths may be combined into a group, and the shared protection will be implemented on the wavelength group. Because the same process is performed for a group of wavelengths, the protection switching will be relatively simpler. However, it is required that the protection switching actions adopted for different wavelengths in the same wavelength group should be consistent with each other, the different wavelengths should have the same source and destination nodes. However, in practice, the possibility to deploy the same service connection on a plurality of spans on the ring for a plurality of wavelengths is small, so the practicality of this method is limited.

In addition to the group shared protection, there also exists a subband multiplex section shared protection, which protects all the wavelengths. This protection mode borrows ideas from the feature of the optical channel shared protection that different wavelengths are used for the bidirectional service connections respectively. A wavelength band such as red band is used on the outer fiber, and another wavelength band such as blue band is used on the inner fiber, wherein the blue band wavelength on the outer fiber is used as the protection wavelength of the blue band wavelength on the inner fiber, and the red band wavelength on the inner fiber is used as the protection wavelength of the red band wavelength on the outer fiber. Apparently, this mode has the same wavelength utilization efficiency as that of the optical channel shared protection wavelength, and on the whole ring, it is only required that the same protection switching units are configured for all the nodes, thus the protection switching for all the wavelength pairs may be realized. When a failure occurs, it only needs to perform protection switching on the node adjacent to the failed segment, thus it is simple and convenient. However, because the subband shared protection still belongs to the multiplex section shared protection, during protection switching, the protected wavelength needs to travel around the protection fiber, which means that the distance the wavelength passes during the protection switching will be much longer than that during a normal working process. Although during the protection switching the longest distance may be less than 1.5 times of the length of the ring via careful wavelength planning, in a WDM system, it means that sufficient OSNR (Optical Signal to Noise Ratio) budget should be reserved for each wavelength connection. Especially in a WDM system with a long span, for this protection method, the OSNR budget and wavelength need to be planned carefully. For this method, there exist a lot of constraint conditions, and the implementing process is complex.

SUMMARY OF THE INVENTION

Therefore, the embodiments of the present invention provide a method, a device and a system for group optical channel shared protection, which make the cost of the optical channel shared protection lower and the realization thereof simpler.

There is provided a method for group optical channel shared protection, which is used for a ring network that is constituted by connecting at least two nodes with two fibers. The two fibers have a relation of mutually working and backing up. The node is adapted to accomplish the add and drop of a service signal, and each node performs the following steps when a failure occurs:

combining affected optical wavelengths, whose source node is current node, on a working fiber into a first group, and switching the first group to a backup fiber;

combining optical wavelengths, whose destination node is the current node, on the backup fiber into a second group, and switching the second group to the working fiber; and combining optical wavelengths, whose destination node is not the current node, on the backup fiber into a third group, and the third group transparently passing through the current node.

Further, the method includes: blocking or stripping off each backup wavelength transferred on the backup fiber according to source and destination information of each backup wavelength, so as to prevent the backup wavelength from forming a loopback.

Wherein, the two fibers with a relation of mutually working and backing up use different wavelengths as a working wavelength respectively, and each of the two fibers takes a wavelength channel, which has the same wavelength as the working wavelength of an opposite party, as a protection wavelength.

The working wavelength used respectively by the two fibers with a relation of mutually working and backing up includes: odd wavelength, even wavelength, red band and blue band.

The mutual switching between the working fiber and backup fiber may be a loopback switching or a cross switching.

Each backup wavelength transferred on the backup fiber is blocked or stripped off by the source node or the destination node of the backup wavelength.

The backup wavelength is blocked or stripped off on a node adjacent to the failure.

The embodiments of the invention provide a system for group optical channel shared protection, which includes a ring network that is constituted by connecting at least two nodes with a first fiber and a second fiber with a mutually working and backing up relation.

Each node is further adapted to combine affected optical wavelengths, whose source node is current node, on the working fiber into a first group and switch the first group to a backup fiber, combine optical wavelengths, whose destination node is the current node, on the backup fiber into a second group and switch the second group to the working fiber, and combine optical wavelength, whose destination node is not the current node, on the backup fiber into a third group, and the third group transparently passes through the current node, when a failure occurs.

The node is further adapted to block or strip off each backup wavelength transferred on the backup fiber according to source and destination information of the backup wavelength, so as to prevent the backup wavelength from forming a loopback.

The node for performing blocking or stripping according to the source and destination information of each backup wavelength is the source node or the destination node of the backup wavelength.

The backup wavelength is further blocked or stripped off on a node adjacent to a failed segment.

Each node includes:

at least two Optical Add Drop Multiplexers, which are connected to the first fiber and the second fiber respectively, for add and drop of a service signal on the fiber connected; and at least four optical wavelength selective devices, wherein two optical wavelength selective devices are connected in series on the first fiber and the second fiber respectively, for blocking the backup wavelength selectively; and two ends of each of the other two optical wavelength selective devices are respectively connected to the first fiber and the second fiber, for selectively switching the optical wavelength on the first fiber to the second fiber or switching the optical wavelength on the second fiber to the first fiber respectively.

The optical wavelength selective device includes: a wavelength blocker; or a combination of an optical demultiplexer, a tunable attenuator and an optical multiplexer; or a combination of an optical demultiplexer, an optical switch array and an optical multiplexer.

The optical wavelength selective device for switching is configured as in open state for affected optical wavelength group whose source node is a current node and working fiber is a failed fiber segment, for switching the optical wavelength to a backup fiber.

The optical wavelength selective device for switching on each node is configured as in open state for a backup wavelength group, whose destination node is a current node, on the backup fiber, for switching the backup wavelength group back to the working fiber, and dropping the service signal by the Optical Add Drop Multiplexer connected on the working fiber.

The optical wavelength selective device connected in series on the fiber on a node for blocking is configured as in blocked state for an optical wavelength group, whose source node or destination node is the current node, for preventing the backup wavelength from forming a loopback on the backup fiber.

The optical wavelength selective device connected in series on the fiber on the node for blocking is configured as in open state for an optical wavelength group, whose source node or destination node is not the current node, so that each optical wavelength, whose source node or destination node is not the current node, on the backup fiber transparently passes through the current node.

The system includes a first, a second, a third and a fourth Optical Add Drop Multiplexer:

the first Optical Add Drop Multiplexer and the second Optical Add Drop Multiplexer are connected with the first fiber, the third Optical Add Drop Multiplexer and the fourth Optical Add Drop Multiplexer are connected with the second fiber;

the first Optical Add Drop Multiplexer is used for the drop of the service signal on the first fiber, the second Optical Add Drop Multiplexer is used for the add of the service signal on the first fiber, the third Optical Add Drop Multiplexer is used for the drop of the service signal on the second fiber, and the fourth Optical Add Drop Multiplexer is used for the add of the service signal on the second fiber.

The system for group optical channel shared protection of the invention may also include six optical wavelength selective devices, in which two optical wavelength selective devices are connected in series on the two fibers respectively, for blocking the backup wavelength selectively; and the two ends of each of the other four optical wavelength selective devices are connected to the first fiber and the second fiber respectively, for selectively switching the working optical wavelength on the first fiber to the second fiber, or switching the backup wavelength on the first fiber to the second fiber, or switching the working optical wavelength on the second fiber to the first fiber, or switching the backup wavelength on the second fiber to the first fiber, respectively.

Each node includes:

at least two Optical Add Drop Multiplexers, which are connected to the first fiber and the second fiber respectively, for the add and drop of the service signal on the fiber connected;

at least two optical wavelength selective devices, the two ends of each are connected to the first fiber and the second fiber respectively, for selectively switching the optical wavelength on the first fiber to the second fiber or switching the optical wavelength on the second fiber to the first fiber respectively; and at least two optical switches, which are connected in series on the first fiber and the second fiber respectively, for forcing the east-oriented or west-oriented fiber to fail at the same time when a failure occurs on the fiber adjacent to the node.

The optical wavelength selective device for switching is configured as in open state for an affected optical wavelength group whose source node is the current node and working fiber is the failed fiber segment, for switching the optical wavelength to the backup fiber.

The optical wavelength selective device for switching on each node is configured as in open state for a backup wavelength group, whose destination node is the current node, on the backup fiber, for switching the backup wavelength group back to the working fiber, and dropping the service signal by the Optical Add Drop Multiplexer connected on the working fiber.

The node adjacent to a failed fiber segment prevents the backup wavelength from forming a loopback on the backup fiber by switching off the optical switch connected with the failed fiber segment.

The two fibers with a relation of mutually working and backing up use different wavelengths as the working wavelength respectively, and each of the two fibers takes the wavelength channel, which has the same wavelength as the working wavelength of the opposite party, as the protection wavelength.

The working wavelength used respectively by the two fibers with a relation of mutually working and backing up comprises: odd wavelength, even wavelength, red band and blue band.

The invention provides a device for optical channel shared protection, which is used in a two-fiber OCh-SPRing comprised of two fibers and at least two nodes. The device includes: at least two optical Add Drop multiplexing units, which are used for a first fiber and a second fiber respectively for add and drop of a service signal on the fiber; at least two optical wavelength selective devices, the two ends of each are connected to the first fiber and the second fiber respectively, for selectively switching the optical wavelength on the first fiber to the second fiber or switching the optical wavelength on the second fiber to the first fiber respectively.

The device for optical channel shared protection further includes at least two optical switches, which are connected in series on the first fiber and the second fiber respectively, for forcing the east-oriented or west-oriented fiber to fail at the same time when a failure occurs on the fiber adjacent to the node.

The node adjacent to a failed fiber segment prevents the backup wavelength from forming a loopback on the backup fiber by switching off the optical switch connected with the failed fiber segment.

The device for optical channel shared protection further includes at least two optical wavelength selective devices, two of which are connected in series on the first fiber and the second fiber respectively, for blocking the backup wavelength selectively.

The optical wavelength selective device for switching is configured as in open state for an affected optical wavelength group whose source node is a current node and working fiber is the failed fiber segment, for switching the optical wavelength to a backup fiber.

The optical wavelength selective device for switching on each node is configured as in open state for a backup wavelength group, whose destination node is the current node, on the backup fiber, for switching the backup wavelength group back to the working fiber, and dropping the wavelength signal by the Optical Add Drop Multiplexer connected on the working fiber.

The optical wavelength selective device includes: a wavelength blocker; or a combination of an optical demultiplexer, a tunable attenuator and an optical multiplexer; or a combination of an optical demultiplexer, an optical switch array and an optical multiplexer.

It can be seen by comparison that the main differences between the technical solution of the invention and the prior art lie in that: when a failure occurs, operations will be made on an optical wavelength group, rather than on a single optical wavelength, and four actions will be performed during switching, i.e., switching the affected optical wavelength group on the working fiber to a backup fiber (Steer); switching the optical wavelength group whose destination node is the current node on the backup fiber to the working fiber (Copy); transparently passing the optical wavelength group whose destination node is not the current node on the backup fiber through the current node (Pass Through); and blocking or stripping off the backup wavelength group transferred on the backup fiber to prevent it from forming a loopback (Strip). There is further disclosed a plurality of node structures for realizing the above four operations, the common feature of which is that a pair of WBs (Wavelength Blockers) exists between the outer and inner fibers, a WB is connected in series on the outer and inner fibers respectively and the outer and inner fibers are respectively connected to an OADM.

Apparent beneficial effects will be brought about due to the above differences of the technical solution. First of all, because group switching is employed, no separate switching device needs to be provided for each wavelength, thus the cost of the system will be saved greatly. Secondly, because the switching distance is shorter, for example, it may be shorter than a round, fewer constraint conditions are laid on the OSNR and so on, the realization process is simpler, and larger ring network may be realized; thirdly, in the solution of the invention, a group of services to be switched uniformly needs not to have the same source and destination nodes, so the system configuration may be more flexible, and the field of application may be broader; moreover, the service node in the solution of the invention may be configured flexibly, and optical channel protection and multiplex section protection may be supported simultaneously.

DETAILED DESCRIPTION OF THE EMBODIMENTS

Figure 1:
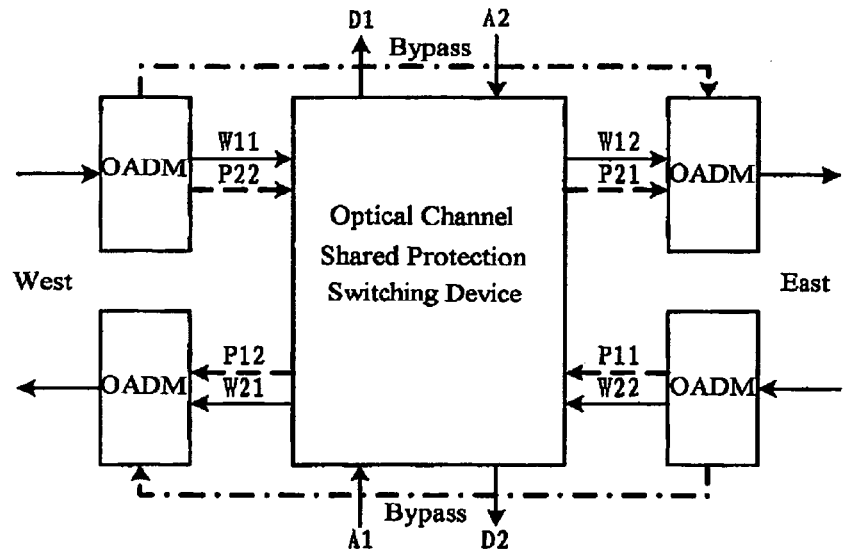
FIG. 1 is a schematic diagram showing the internal components of an existing optical channel shared protection node.

To further understand the objects, the technical solutions and the advantages of the invention, it will now be further described in detail in conjunction with the drawings.

First of all, the basic principle of the invention will be illustrated. In the prior art, when wavelengths are grouped for protection, the possibility that different wavelength pairs in the same group are all generated or terminated on the same source node or destination node is very small. To overcome this restriction, a uniform protection switching should be performed for the wavelengths with different source nodes or destination nodes. A wavelength selective device is employed in the invention, which includes a wavelength blocker and a wavelength selector, for re-disassembling and combining these wavelength groups on different nodes. In the invention, each node processes the affected optical wavelength channel service, of which the node itself acts as the source node or the destination node, so that functions of Steer, Copy, Pass through and Strip may be accomplished. After a failure occurs, the process of Steer is performed on the source node, and the source optical channel group is separated from the local added service and switched from the working fiber to a backup fiber for transmission. The process of Copy is performed on the destination node, and the destination optical channel group is separated from the protection channel of the backup fiber and switched to the working fiber for terminating on the destination node. Meanwhile, the source node or destination node may weed out the source optical channel group or destination optical channel group from the corresponding backup fiber using the Strip process. The Pass Through process is performed on an intermediate node, the backup channel signal switched by the last node to the backup fiber is transparently transmitted to the next node according to a signaling or the detection result obtained by the intermediate node itself. It should be noted that the destination nodes of these source optical channel groups may not be the same; by the same token, the source nodes of the destination optical channel groups may not be the same. By realizing the above four functions on each node of the ring, the group optical channel shared protection may be provided flexibly on a WDM ring, so that the cost of the system may be lowered and the realization of the system may be simplified.

It should be noted that the working fiber and the backup fiber are regarded with respect to the optical wavelength transferred, rather than regarding one of the two fibers as the working fiber and the other as the backup fiber fixedly. In other words, if an optical wavelength is transferred via a first fiber in normal situations, for this optical wavelength, the first fiber is the working fiber, and a second fiber is the backup fiber used when a failure occurs. In practice, the two fibers have a relation of mutually working and backing up, wherein the optical wavelength transferred in the first fiber in normal situations takes the second fiber as the backup fiber, while the optical wavelength transferred in the second fiber in normal situations takes the first fiber as the backup fiber.

A system for group optical channel shared protection includes a plurality of services nodes. These service nodes are connected via fibers to form a WDM ring network, wherein each node may provide functions of Steer, Copy, Pass Through and Strip. With respect to the optical wavelength channel service, the service nodes are classified into three categories: source node, destination node and intermediate node. In a preferred embodiment of the invention, after a failure occurs, the process of Steer is performed on the source node, and the source optical channel group is separated from the local added service and switched from the working fiber to the backup fiber for transmission; the process of Copy is performed on the destination node, and the destination optical channel group is separated from the protection channel of the backup fiber and switched to the working fiber for terminating on the destination node; meanwhile, the source node or destination node may weed out the source optical channel group or destination optical channel group from the corresponding backup fiber with the Strip process; the process of Pass Through is performed on an intermediate node, the backup channel signal switched by the last node to the backup fiber is transparently transmitted to the next node according to a signaling or the detection result obtained by the intermediate node itself. It should be noted that for a service node, the source optical channel group is consisted of optical wavelength channels of all the services that take this service node as the source node, and the destination optical channel group is consisted of optical wavelength channels of all the services that take this service node as the destination node.

It should be noted that in the invention, "Steer" refers in particular to the process in which a source optical channel group is separated from a local added service on the source node and switched from the working fiber to the backup fiber, for convenience, it may be simplified as "switch"; "Copy" refers in particular to the process in which a destination optical channel group is separated from the protection channel of the backup fiber on a destination node and switched to the working fiber.

Figure 2:
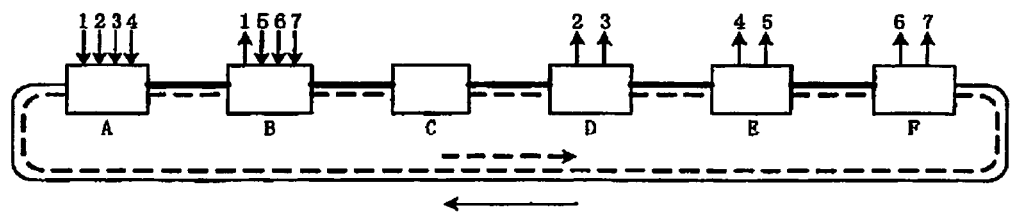
FIG. 2 is a schematic diagram showing the principle of the group optical channel shared protection.
Figure 2:
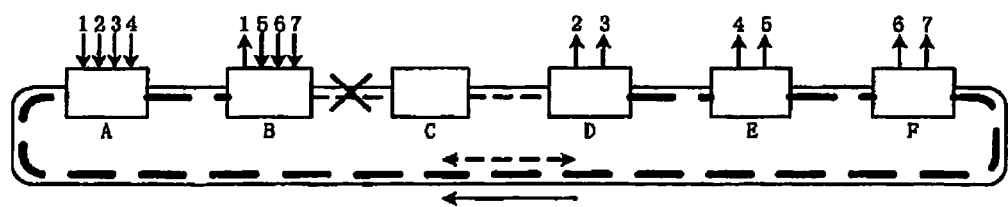

In a preferred embodiment of the invention, in a WDM network as shown in FIG. 2, the outer fiber is in the clockwise direction presented by a solid line, the inner fiber is in the anticlockwise direction represented by a dashed line, and the service connections are all distributed on the clockwise outer fiber. At this point, the transmission path of the service connections is marked by bold solid lines. Wherein, A, B, C, D, E and F are service nodes. A service connection (service 1, 4) exists between service node A and B and between service node A and E, respectively; two service connections (service 2, 3) exist between A and D; a service connection (service 5) exists between B and E; and two service connections (service 6, 7) exist between B and F. It should be noted that the numbers in FIG. 2 are used for marking service connections, and different services, such as service 1 and service 7, may use the same wavelength.

After failure occurs on the fiber segment between service node B and service node C, service nodes A and B perform action "Steer" on its original optical channel group respectively, the services from service nodes A, B to service nodes D, E and F, i.e., services 2, 3, 4, 5, 6 and 7, will be switched to the inner fiber for transmission, but the service from A to B, i.e., service 1, will not be switched. At the same time, service node A also needs to perform the action "Pass Through", so as to pass the services from node B to nodes E and F, i.e., service 5, 6, 7, through node A. On node F, because services 6 and 7 delivered from service node B are to be disassembled and terminated on the local node, action "Copy" is performed, and the services from nodes A, B to nodes D, E, i.e., services 2, 3, 4 and 5, are to be passed through continuously, action "Pass Through" is performed. The similar actions to that on service node F are performed on service nodes D and E, so they will not be illustrated in detail again. It should be noted that because no service is terminated on service node C, when a failure occurs on fiber segments B and C, no action will be performed on service node C. However, when failure occurs on a span that is not adjacent to service node C on the ring, service node C needs to perform action "Pass Through". It should be noted that when the failure only occurs on the outer fiber and no failure occurs on the inner fiber, the service nodes on the ring must be able to set a terminating point on a service node between the destination node and the source node (including set the terminating point on the destination node or the source node) for the optical wavelength channel that is switched from the outer fiber to the inner fiber. In a preferred embodiment of the invention, the terminating point is set on the destination node or the source node, because the destination node and the source node may be adjacent to each other. It should be noted that if the terminating point is set on the source node, it means that the optical signal travels around the inner fiber and is finally stripped off on the source node. In FIG. 2, action "Strip" is performed on service node A or B. If the terminating point is set on the destination node, action "Strip" is performed on nodes D, E and F respectively, and at this point, the optical signal does not travel around the ring. The reason for setting a terminating point and performing action "Strip" is that if there is no terminating point, when a unidirectional fiber failure occurs, the optical signal may form a loopback on the backup fiber and lead to lasing, and finally the quality of the optical signal may be affected. The transmission path of the service connection is marked by a bold dashed line in FIG. 2.

To clearly illustrate the solution according to the embodiments of the invention, it will now be illustrated in conjunction with the specific implementation of the service nodes in preferred embodiments of the invention.

Figure 3:
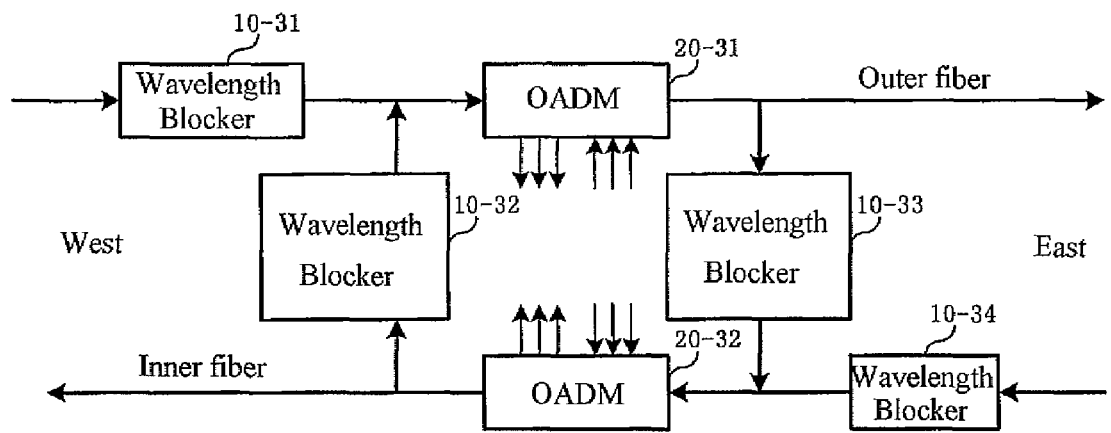
FIG. 3 is a schematic diagram showing the internal components of a node in the group optical channel shared protection terminated on a source node according to an preferred embodiment of the invention.

According to a preferred embodiment of the invention, in a system for group optical channel shared protection terminated on the source node, a schematic diagram of the internal components of the service node is shown in FIG. 3.

In this preferred embodiment, the service node includes: four wavelength blockers 10 (represented by 10-31, 10-32, 10-33 and 10-34 respectively), and two OADMs (Optical Add Drop Multiplexers) 20 (represented by 20-31 and 20-32 respectively).

The wavelength blocker 10-31 receives a service entering from a west-oriented outer fiber, and its output terminal is connected with the input terminal of the OADM 20-31; the input terminal of the wavelength blocker 10-32 is connected with the output terminal of the OADM 20-32, and its output terminal is connected with the input terminal of the OADM 20-31; the input terminal of the wavelength blocker 10-33 is connected with the output terminal of the OADM 20-31, and its output terminal is connected with the input terminal of the OADM 20-32; the wavelength blocker 10-34 receives the service entering from the east-oriented inner fiber, and its output terminal is connected with the input terminal of the OADM 20-32; the OADM 20-31 outputs the service from the east-oriented outer fiber; and the OADM 20-32 outputs the service from the west-oriented inner fiber.

The wavelength blocker 10 is adapted to block or allow a service of a certain wavelength to pass by changing its state. The specific implementation and function of the wavelength blocker 10 are well-known to those skilled in the art, so it will not be illustrated in detail here.

The OADM 20 is adapted to accomplish the multiplexing/demultiplexing of a service and implement the add and drop of a client service. The specific implementation and function of the OADM 20 are well-known to those skilled in the art, so it will not be illustrated in detail here.

Those skilled in the art may appreciate that according to the complementation principle of the allocation of working wavelengths on the inner and outer fibers, red/blue band allocation may be employed, or odd/even wavelength allocation may be employed, or even other allocation may be employed. As long as the working wavelengths on the two fibers are different, when the corresponding wavelengths are used as backup mutually, the functions of Steer, Pass Through, Copy and Strip may be realized by configuring the wavelength blocker 10 to be on or off for specific wavelength channels. For example, in this preferred embodiment of the invention, during normal working process, the wavelength blocker 10-32 and the wavelength blocker 10-33 are in totally blocked state, while the wavelength blocker 10-31 and the wavelength blocker 10-34 are in red band block and blue band pass state or in blue band block and red band pass respectively. After a failure occurs on the east-oriented fiber, all the east-oriented services on the above node will be affected. At this point, the wavelength blocker 10-33 will open the wavelength channel corresponding to the local east-oriented added service, and switch all the local east-oriented added services on the node to the inner fiber for transmission. Because the wavelengths of the outer fiber and the inner fiber are conflicted during normal working process, the inner fiber will not be congested after the services are switched, thus the function of Steer may be accomplished on the node. Because the fiber failure may only affect one of the fibers, if only the outer fiber is interrupted and the inner fiber remains intact, in order to accomplish the function of Strip, the wavelength blocker 10-34 only needs to configure the wavelength channel corresponding to the wavelength channel opened in the wavelength blocker 10-33 in blocked state, thus the wavelength switched from the outer fiber to the inner fiber may be wed out from the loop, so that the problem of loopback lasing in the inner fiber may be avoided. Thus, the function of source node Strip may be performed on the node. When the disconnection failure occurs on both of the adjacent east-oriented outer and inner fibers, the local east-oriented dropped service of the node may also be affected. When a corresponding source node switches the service from the inner fiber to the outer fiber and transfers the service to the current node, the wavelength blocker 10-31 and the wavelength blocker 10-33 also needs to open a channel for these wavelength services, so that the services may be again switched from the outer fiber to the inner fiber, and the demultiplexing of the corresponding wavelength is accomplished in the OADM 20, thus the function of Copy may be accomplished. For the local east-oriented dropped service, it is switched on the node on the opposite side of the failed segment (which may be or may be not adjacent to the failed segment) from the inner fiber to the outer fiber and passes through the intermediate node in anticlockwise direction (it is hypothesized that the source node and destination node of the local east-oriented dropped service are not adjacent to each other in the west). The wavelength blocker 10-31 arranged on the outer fiber of the intermediate node should be able to ensure that the wavelength switched from the inner fiber to the outer fiber can transparently pass through the node, so that the function of Pass Through may be accomplished. Correspondingly, the wavelength blocker 10-34 which is arranged on a non-source node also needs to ensure that the backup wavelength switched from the outer fiber to the inner fiber can also pass through, so as to accomplish the function of Pass Through.

It should be noted that termination may be realized on the source node or the destination node with Strip. During the specific realization process, it depends on that on which service node the state of the wavelength blocker 10 is configured so as to realize the function of Strip for a certain wavelength channel. This will not affect the essential of the invention.

Those skilled in the art may appreciate that in the implementation of the above four functions, the destination nodes of the source optical channel group may be either identical or not, and the source nodes of the destination optical channel group may also be either identical or not.

Figure 4:
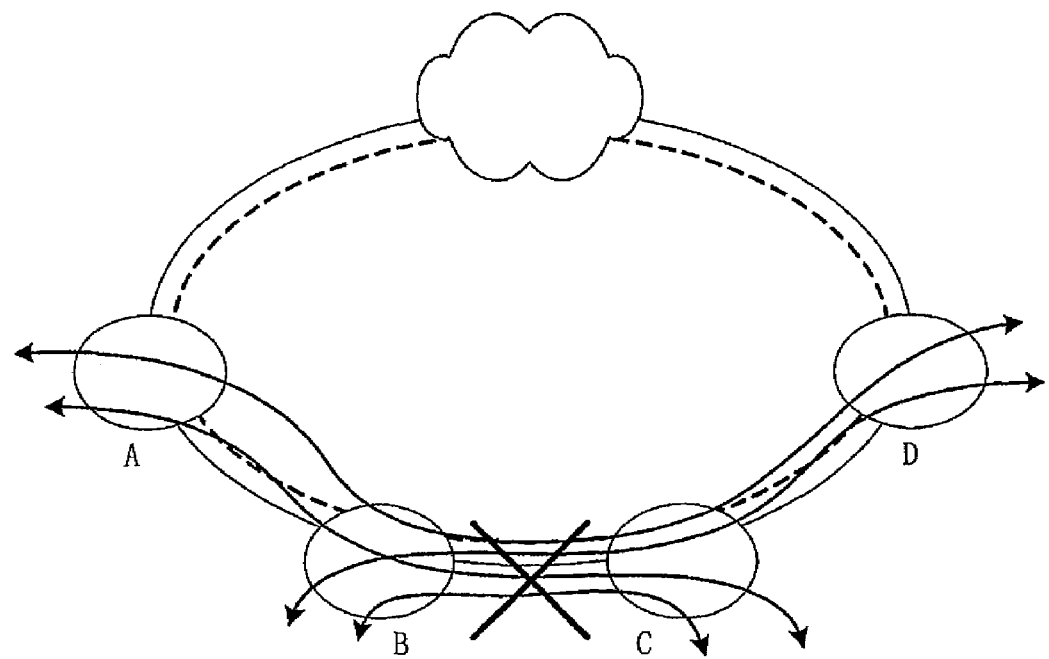
FIG. 4 is a schematic diagram showing the service connection with the same source node but different destination node and with the same destination node but different source node, and showing the situation when a failure occurs on the service connection, according to a preferred embodiment of the invention.

FIG. 4 is a schematic diagram showing the service connections with the same source node but different destination nodes and with the same destination node but different source nodes, and the situation when a failure occurs on the service connection, according to a preferred embodiment of the invention.

Now, the process for realizing such a group optical channel shared protection according to a preferred embodiment of the invention will be further described in conjunction with the node structure shown in FIG. 3 and in conjunction with FIG. 4.

Between the four nodes A, B, C and D on the ring shown in FIG. 4, there exists a wavelength connection respectively. These wavelength connections all pass through the fiber segment between B and C, the connection is in anticlockwise direction on the inner fiber and in clockwise direction on the outer fiber. The inner fiber and the outer fiber correspond to the outer fiber and the inner fiber shown in FIG. 3 respectively. After a failure occurs on the fiber segment between B and C, the node C switches the service, which should be originally delivered to A or B from the outer fiber, to the inner fiber for transmission. When the optical wavelength signals corresponding to C->A and C->B reach the node A, the wavelength blocker 10-31 on the node A opens a channel for the two wavelengths of C->A and C->B, but the wavelength blocker 10-33 only opens a channel for the wavelength C-A. In a preferred embodiment of the invention, the function of Strip is accomplished on the source node, so the optical wavelength signals corresponding to C->A and C->B travel around the fiber after they are switched to the inner fiber. It should be noted that if a disconnection failure occurs on the segment between B and C of the inner fiber at the same time, the signals of C->A and C->B are stripped off from the ring before reaching the node C. When the optical wavelength signals corresponding to C->A and C->B reach the node B, the wavelength blocker 10-31 on the node B also opens a channel for the two wavelengths, but the wavelength blocker 10-33 of the node B only opens a channel for the optical wavelength corresponding to C->B, so that the optical wavelength signal corresponding to C->B is switched to a normal working channel, and the whole protection switching action is accomplished. In the practical implementation, the optical wavelength signal of the node A corresponding to C->A may also be blocked by the wavelength blocker 10-31 on the node B, but the optical wavelength signal corresponding to C->B can only be blocked by the node C.

It may be appreciated by those skilled in the art that when a failure occurs on the west-oriented adjacent fiber segment of the above node, the west-oriented protection switching process may be accomplished by exchanging the function performed by the wavelength blocker 10-31 and wavelength blocker 10-34, and exchanging the function performed by the wavelength blocker 10-32 and the wavelength blocker 10-33. It is analogous to exchanging the roles of the nodes A, B and that of the nodes C, D shown in FIG. 4, so it will not be described again here.

Figure 5:
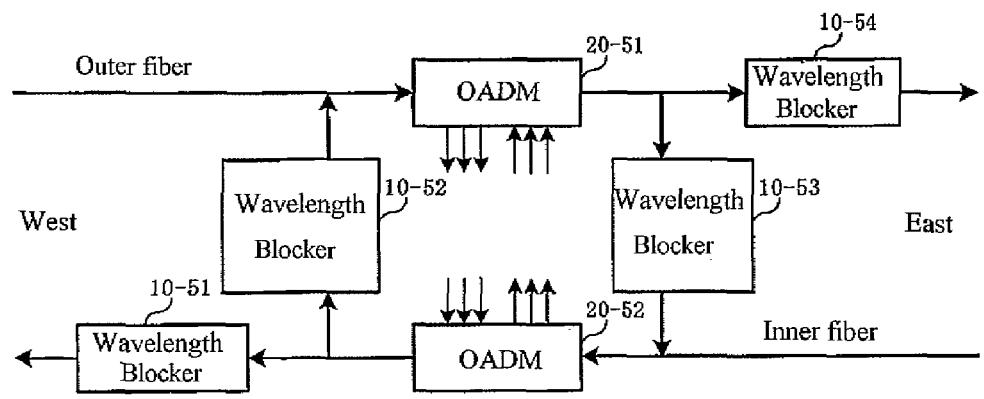
FIG. 5 is a schematic diagram showing the internal components of a node in the group optical channel shared protection terminated on a destination node according to a preferred embodiment of the invention.

FIG. 5 is a schematic diagram showing the internal components of a node in a group optical channel shared protection terminated on the destination node according to a preferred embodiment of the invention.

In this preferred embodiment, the service node includes: four wavelength blockers 10 (represented by 10-51, 10-52, 10-53 and 10-54 respectively), and two OADMs 20 (represented by 20-51 and 20-52 respectively).

The input terminal of the wavelength blocker 10-51 is connected with the output terminal of the OADM 20-52, and the wavelength blocker 10-51 outputs the service from the west-oriented inner fiber; the input terminal of the wavelength blocker 10-52 is connected with the output terminal of the OADM 20-52, and its output terminal is connected with the output terminal of the OADM 20-51; the input terminal of the wavelength blocker 10-53 is connected with the output terminal of the OADM 20-51, and its output terminal is connected with the input terminal of the OADM 20-52; the input terminal of the wavelength blocker 10-54 is connected with the output terminal of the OADM 20-51, and the wavelength blocker 10-54 outputs the service from the east-oriented outer fiber; the OADM 20-51 receives the service from the west-oriented outer fiber; and the OADM 20-52 receives the service from the east-oriented inner fiber.

In this preferred embodiment of the invention, when a failure occurs on the east-oriented adjacent fiber segment and the local east-oriented dropped service is affected, the source node on the opposite side of the east-oriented adjacent fiber segment (which may be or may be not adjacent to the failed segment) switches the service to the outer fiber and loops it back to the above node. After the wavelength blocker 10-53 opens a channel for the corresponding service, the corresponding dropped wavelength may be looped back from the outer fiber to the inner fiber, and the protection switching process for the service may be accomplished. As different from the preferred embodiment shown in FIG. 3, the wavelength blocker 10-54 needs to block the optical channel opened by the wavelength blocker 10-53, so that the function of Strip may be accomplished. In this preferred embodiment, the protection optical wavelength is wed out from the protection fiber link on the destination node, so it is referred to as an optical channel shared protection terminated on the destination node. The implementation of other functions such as Steer, Copy and Pass Through is similar to that in the embodiment shown in FIG. 3, and it may be easily realized by those skilled in the art by referring to the embodiment shown in FIG. 3, so it will not be illustrated in detail here.

Figure 6:
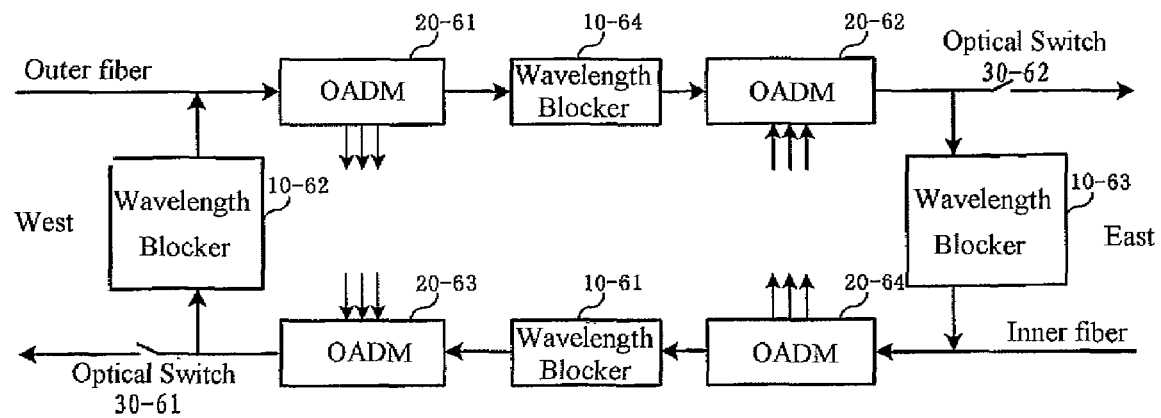
FIG. 6 is a schematic diagram showing the internal components of a node in a loopback group optical channel shared protection according to a preferred embodiment of the invention.

FIG. 6 is a schematic diagram showing the internal components of a node in a loopback group optical channel shared protection according to a preferred embodiment of the invention.

In this preferred embodiment, the service node includes: four wavelength blockers 10 (represented by 10-61, 10-62, 10-63 and 10-64 respectively), four OADMs 20 (represented by 20-61, 20-62, 20-63 and 20-64 respectively) and two optical switches 30 (represented by 30-61 and 30-62 respectively).

Wherein, the optical switch 30 is adapted to control the onoff of the fiber by switch-on or switch-off, so as to avoid the loopback lasing. The specific implementation and function of the optical switch 30 are well-known to those skilled in the art, so it will not be illustrated in detail here.

The input terminal of the wavelength blocker 10-61 is connected with the output terminal of the OADM 20-64, and its output terminal is connected with the input terminal of the OADM 20-63; the input terminal of the wavelength blocker 10-62 is connected with the output terminal of the OADM 20-63, and its output terminal is connected with the input terminal of the OADM 20-61; the input terminal of the wavelength blocker 10-63 is connected with the output terminal of the OADM 20-62, and its output terminal is connected with the input terminal of the OADM 20-64; the input terminal of the wavelength blocker 10-64 is connected with the output terminal of the OADM 20-61, and its output terminal is connected with the input terminal of the OADM 20-62; the OADM 20-61 receives the service from the west-oriented outer fiber; the OADM 20-62 outputs the service from the east-oriented outer fiber via the optical switch 30-62; the OADM 20-63 outputs the service from the west-oriented inner fiber via the optical switch 30-61; and the OADM 20-64 receives the service from the east-oriented inner fiber.

Those skilled in the art may appreciate that in the preferred embodiment shown in FIG. 6, after a selective loopback function is performed with the cooperation of the wavelength blocker 10-62 and the wavelength blocker 10-63, the function of group optical channel shared protection may also be realized. For example, in this preferred embodiment, during normal working process, the wavelength blocker 10-61 and the wavelength blocker 10-64 are in red band pass and blue band block state and blue band pass and red band block state respectively; the optical switch 30-61 and the optical switch 30-62 are both in switch-on state; and the wavelength blocker 10-62 and the wavelength blocker 10-63 are in totally blocked state respectively. After a disconnection failure occurs on the east-oriented adjacent fiber segment, because the current node detects no signal on the inner fiber at first, the node may determine that a disconnection failure occurs on the inner fiber, and it issues an instruction to the optical switch 30-61 for disconnecting, so that a fiber doublebreak failure mode may be simulated. Thereafter, an optical wavelength channel corresponding to the locally affected local east-oriented added service is opened on the wavelength blocker 10-63, and the optical wavelength signal received on the outer fiber is switched to the inner fiber and looped back for transmission, and the wavelength blocker 10-61 also needs to perform the similar opening action for the loopback wavelength, so that the Steer source protection switching for the source optical channel group may be accomplished. The opening action is also performed for these wavelengths by the wavelength blocker 10-61 on a west-oriented downstream node of the current node, so that it may be ensured that the backup channel may reach the west-oriented dropped optical demultiplexer of the destination node freely. At this point, the action performed by the wavelength blockers 10-61 of these nodes is Pass Through. When the signal reaches the destination node, the wavelength blocker 10-62 of the destination node opens a wavelength channel for the destination node, and the switching from the inner fiber to the outer fiber may be accomplished. At this point, the wavelength blocker 10-62 performs the action Copy. In other words, the wavelength blocker 10-62 and the wavelength blocker 10-63 perform the function of Steer as well as the function of Copy at the same time. The function of Strip is accomplished by the above optical switch 1. In the fiber doublebreak failure mode simulated by the optical switch 1, any one of the fibers may be prevented from forming a loopback, so that the loopback lasing may be avoided.

In this preferred embodiment, the east-oriented OADM 20 and the west-oriented OADM 20 are separated. At present, this mode is used by the wavelength blocker 10 mostly, which may ensure that the OADM 20 can be updated online limitlessly.

Figure 7:
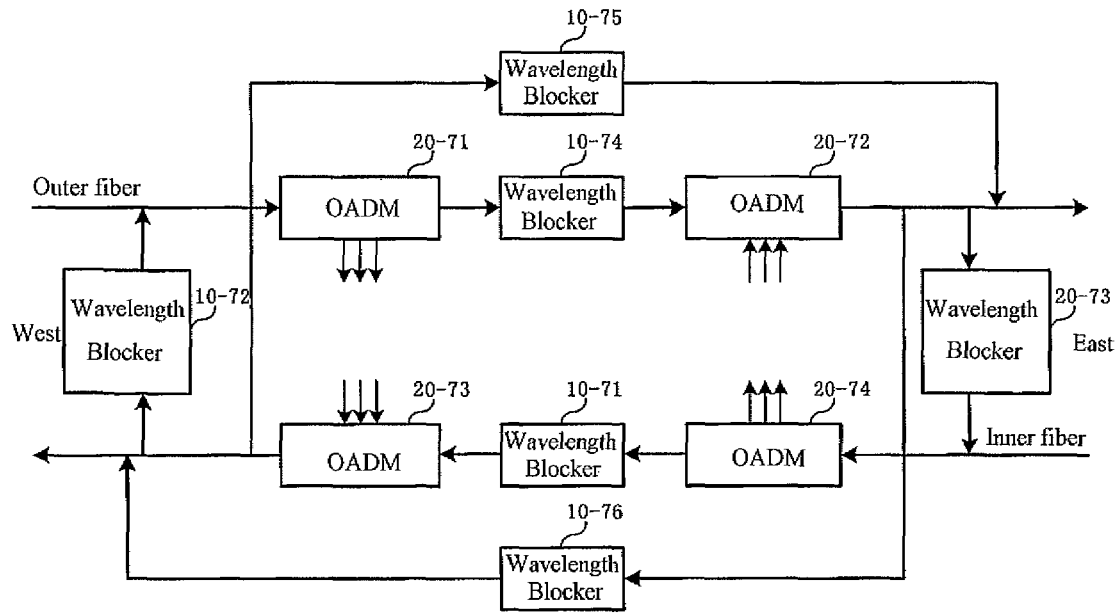
FIG. 7 is a schematic diagram showing the internal components of a node in a source stripped cross group optical channel shared protection according to a preferred embodiment of the invention.

FIG. 7 is a schematic diagram showing the internal components of a node in a source stripped cross group optical channel shared protection according to a preferred embodiment of the invention.

In this preferred embodiment, the service node includes: six wavelength blockers 10 (represented by 10-71, 10-72, 10-73, 10-74, 10-75 and 10-76 respectively), and four OADMs 20 (represented by 20-71, 20-72, 20-73 and 20-74 respectively).

The input terminal of the wavelength blocker 10-71 is connected with the output terminal of the OADM 20-74, and its output terminal is connected with the input terminal of the OADM 20-73; the input terminal of the wavelength blocker 10-72 is connected with the output terminal of the OADM 20-73, and its output terminal is connected with the input terminal of the OADM 20-71; the input terminal of the wavelength blocker 10-73 is connected with the output terminal of the OADM 20-72, and its output terminal is connected with the input terminal of the OADM 20-74; the input terminal of the wavelength blocker 10-74 is connected with the output terminal of the OADM 20-71, and its output terminal is connected with the input terminal of the OADM 20-72; the input terminal of the wavelength blocker 10-75 is connected with the output terminal of the OADM 20-73, and its output terminal is connected with the output terminal of the OADM 20-72; the input terminal of the wavelength blocker 10-76 is connected with the output terminal of the OADM 20-72, and its output terminal is connected with the output terminal of the OADM 20-73; the OADM 20-71 receives the service from the west-oriented outer fiber; the OADM 20-72 outputs the service from the east-oriented outer fiber; the OADM 20-73 outputs the service from the west-oriented inner fiber; and the OADM 20-74 receives the service from the east-oriented inner fiber.

In this preferred embodiment, the function of Copy is performed by the wavelength blocker 10-72 and the wavelength blocker 10-73, the function of Steer is performed by the wavelength blocker 10-75 and the wavelength blocker 10-76, the functions of Pass Through and Source Strip are performed by the wavelength blocker 10-71 and the wavelength blocker 10-74. For example, in this preferred embodiment, if a failure occurs on the east-oriented adjacent fiber segment of the node shown in FIG. 7, the wavelength blocker 10-76 opens a wavelength channel corresponding to the local east-oriented added service, and allows the added service to directly loop back via the wavelength blocker 10-76 to the west-oriented inner fiber of the node for transmission, so that the function of Steer is accomplished. Correspondingly, the local east-oriented dropped service is switched to the outer fiber on its source node and then looped back to the current node. At this point, the wavelength blocker 10-74 and the wavelength blocker 10-73 both open the wavelength channels which will be terminated locally, so that these wavelengths are looped back to the inner fiber, and the function of Copy is accomplished. The wavelength blocker 10-71 of the current node blocks the optical signal that is added locally and passes through the wavelength blocker 10-76, so that a loopback lasing may be avoided, and the function of Source Strip is performed. For an intermediate node, the wavelength blocker 10-74 and the wavelength blocker 10-71 open a protection optical channel respectively for the wavelengths switched to the outer and inner fibers on the source node, so that the wavelengths may pass through the intermediate node and reach the destination node. At this point, the wavelength blocker 10-71 and the wavelength blocker 10-74 of the intermediate node perform the function of Pass Through.

Figure 8:
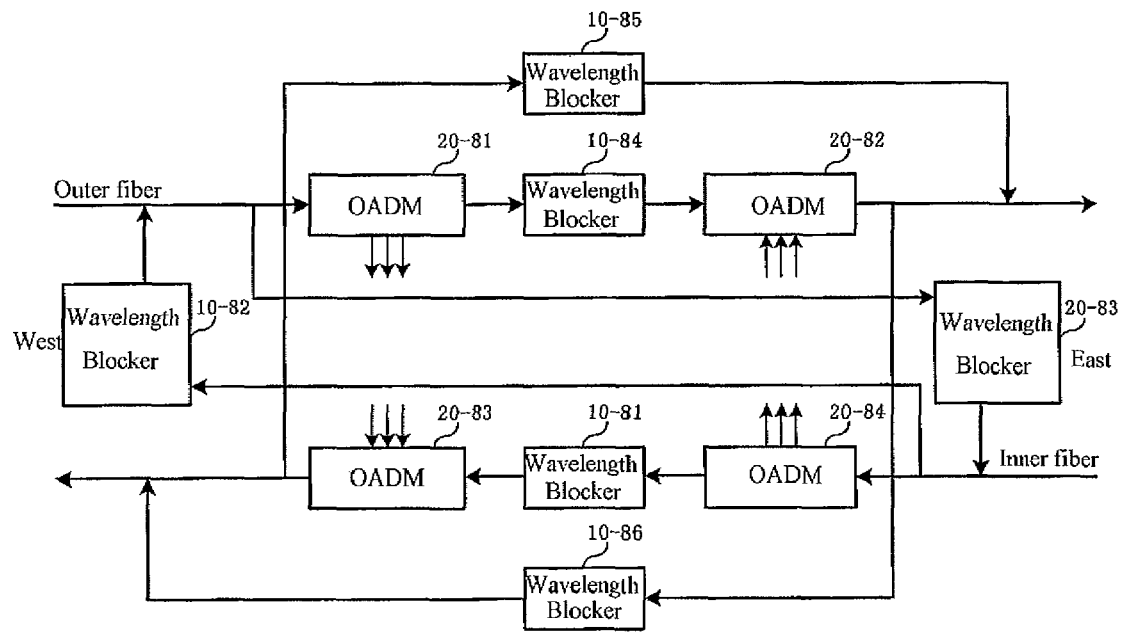
FIG. 8 is a schematic diagram showing the internal components of a node in a destination stripped cross group optical channel shared protection according to a preferred embodiment of the invention.

FIG. 8 is a schematic diagram showing the internal components of a node in a destination stripped cross group optical channel shared protection according to a preferred embodiment of the invention.

In this preferred embodiment, the service node includes: six wavelength blockers 10 (represented by 10-81, 10-82, 10-83, 10-84, 10-85 and 10-86 respectively), and four OADMs 20 (represented by 20-81, 20-82, 20-83 and 20-84 respectively).

The input terminal of the wavelength blocker 10-81 is connected with the output terminal of the OADM 20-84, and its output terminal is connected with the input terminal of the OADM 20-83; the input terminal of the wavelength blocker 10-82 is connected with the input terminal of the OADM 20-84, and its output terminal is connected with the input terminal of the OADM 20-81; the input terminal of the wavelength blocker 10-83 is connected with the input terminal of the OADM 20-81, and its output terminal is connected with the input terminal of the OADM 20-84; the input terminal of the wavelength blocker 10-84 is connected with the output terminal of the OADM 20-81, and its output terminal is connected with the input terminal of the OADM 20-82; the input terminal of the wavelength blocker 10-85 is connected with the output terminal of the OADM 20-83, and its output terminal is connected with the output terminal of the OADM 20-82; the input terminal of the wavelength blocker 10-86 is connected with the output terminal of the OADM 20-82, and its output terminal is connected with the output terminal of the OADM 20-83; the OADM 20-81 receives the service from the west-oriented outer fiber; the OADM 20-82 outputs the service from the east-oriented outer fiber; the OADM 20-83 outputs the service from the west-oriented inner fiber; and the OADM 20-84 receives the service from the east-oriented inner fiber.

In this preferred embodiment, the function of Strip may be realized on the destination node. For example, in this preferred embodiment, if a failure occurs on the east-oriented adjacent fiber segment of the node, the local east-oriented dropped service of the node will be switched on its source node from the inner fiber to the outer fiber and looped back to the outer fiber and then transferred to the current node. At this point, the wavelength blocker 10-83 opens the optical wavelength channels corresponding to these services, so that the optical wavelength service may be switched from the outer fiber backup channel to the inner fiber working channel. Meanwhile, the wavelength blocker 10-84 blocks these optical wavelength channels, so that the protection optical wavelength is wed out or stripped off on the destination node, in other words, the function of Strip is accomplished. If the wavelength blocker 10-84 does not block the optical wavelength channels and the optical wavelength channels are still blocked by the wavelength blocker 10-84 of the source node corresponding to these services, the function of Source Strip is performed. In other words, with the preferred embodiment shown in FIG. 8, the function of Source Strip in the preferred embodiment shown in FIG. 7 may also be accomplished.

Figure 9:
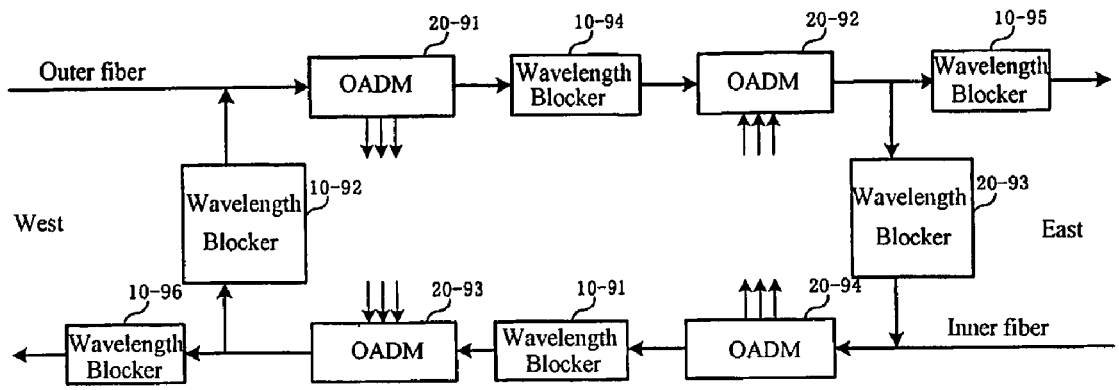
FIG. 9 is a schematic diagram showing the internal components of a node in a destination stripped loopback group optical channel shared protection according to a preferred embodiment of the invention.

FIG. 9 is a schematic diagram showing the internal components of a node in a destination stripped loopback group optical channel shared protection according to a preferred embodiment of the invention.

In this preferred embodiment, the service node includes: six wavelength blockers 10 (represented by 10-91, 10-92, 10-93, 10-94, 10-95 and 10-96 respectively), and four OADMs 20 (represented by 20-91, 20-92, 20-93 and 20-94 respectively).

The input terminal of the wavelength blocker 10-91 is connected with the output terminal of the OADM 20-94, and its output terminal is connected with the input terminal of the OADM 20-93; the input terminal of the wavelength blocker 10-92 is connected with the output terminal of the OADM 20-93, and its output terminal is connected with the input terminal of the OADM 20-91; the input terminal of the wavelength blocker 10-93 is connected with the output terminal of the OADM 20-92, and its output terminal is connected with the input terminal of the OADM 20-94; the input terminal of the wavelength blocker 10-94 is connected with the output terminal of the OADM 20-91, and its output terminal is connected with the input terminal of the OADM 20-92; the input terminal of the wavelength blocker 10-95 is connected with the output terminal of the OADM 20-92, and the wavelength blocker 10-95 outputs the service from the east-oriented outer fiber; the input terminal of the wavelength blocker 10-96 is connected with the output terminal of the OADM 20-93, and the wavelength blocker 10-96 outputs the service from the west-oriented inner fiber; the OADM 20-91 receives the service from the west-oriented outer fiber; and the OADM 20-94 receives the service from the east-oriented inner fiber.

The implementation of the preferred embodiment shown in FIG. 9 is similar to that of the preferred embodiment shown in FIG. 5. Wherein, the function of Pass Through may be performed by the wavelength blocker 10-91 and the wavelength blocker 10-94, or it may be performed by the wavelength blocker 10-95 and the wavelength blocker 10-96; and the function of Strip is performed by the wavelength blocker 10-95.

It can be seen by those skilled in the art that these embodiments have a common ground that at least two optical wavelength blockers 10 with opposite directions are connected between the outer fiber and the inner fiber in a service node, and the outer fiber and the inner fiber respectively have at least one OADM 20 and one optical wavelength blocker 10. The functions of Steer, Copy, Pass Through and Strip are realized by configuring the state of a plurality of optical wavelength blockers 10, the add or drop of a service is accomplished by the OADM, the functions of Steer and Copy are accomplished by the optical wavelength blockers connected between the outer fiber and the inner fiber, and the functions of Pass Through and Strip are accomplished by the optical wavelength blockers 10 on the outer fiber and the inner fiber.

It may be appreciated by those skilled in the art that some modifications may be made on the details of the embodiments of the invention. For example, other wavelength selective devices may be employed to replace the optical wavelength blocker 10. Or, the functions of Steer, Copy, Pass Through and Strip may also be accomplished by changing the connection relations between the internal components of the service node. These will not influence the essential of the invention.

It should be noted that for smoothly updating the system, the input terminal of the OADM 20 may be directly connected with the output terminal. This is equivalent to adding a power splitting interface to the input terminal of the OADM 20, so that part of the power is directly output to the output terminal of the OADM 20, which is equivalent to the Express in the prior art. It may be appreciated by those skilled in the art that this will not influence the implementation of the invention.

It should be noted that although the technical solution of the invention is put forward for realizing group optical channel shared protection, it may be appreciated by those skilled in the art that by using the service node of the invention on which the functions of Steer, Copy, Pass Through and Strip may be realized, the technical solution of the invention may also be used directly or with slight modification for realizing the subband multiplex section protection. FIG. 11 is a schematic diagram showing the system of a ring network in which the device for group optical channel shared protection according to the embodiments of the invention is adopted for realizing the multiplex section protection, and the system of the ring network after a failure occurs. Wherein, the transmission path for the service connection before a failure occurs is marked by a bold solid line in FIG. 11, and the transmission path for the service connection after a failure occurs is marked by a bold dashed line in FIG. 11. The implementation as shown in FIG. 11 is apparent to those skilled in the art. When a failure occurs on the fiber segment between B and C, the node B loops back all the clockwise optical wavelength channels on the outer fiber to the inner fiber for transmission, the node C loops back all the anticlockwise optical wavelength channels on the inner fiber to the outer fiber for transmission, and no action is performed on the other nodes. Thus, subband multiplex section protection may be realized. For example, in the system for group optical channel shared protection terminated on the source node as shown in FIG. 3, 10-33 on the node B switches all the east-oriented optical wavelength signals on the node B to the inner fiber, while 10-32 on the opposite-side node C switches all the west-oriented optical wavelength signals on the node C to the outer fiber, thus subband multiplex section protection may be accomplished. 10-31 and 10-34 are adapted to avoid the loopback lasing on the backup channel when a unidirectional failure occurs on the fiber.

Figure 10:
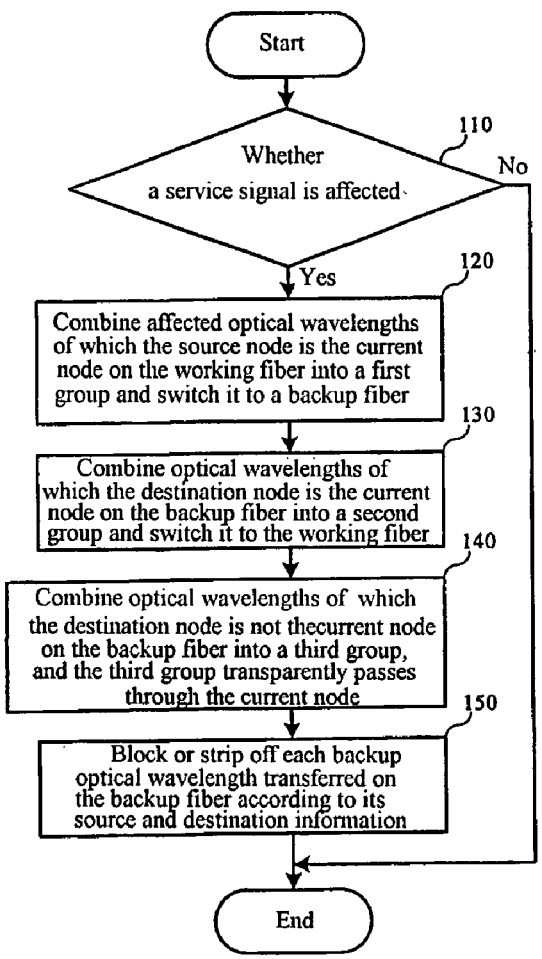
FIG. 10 is a flow chart of a method for group optical channel shared protection according to a preferred embodiment of the invention.
Figure 11:
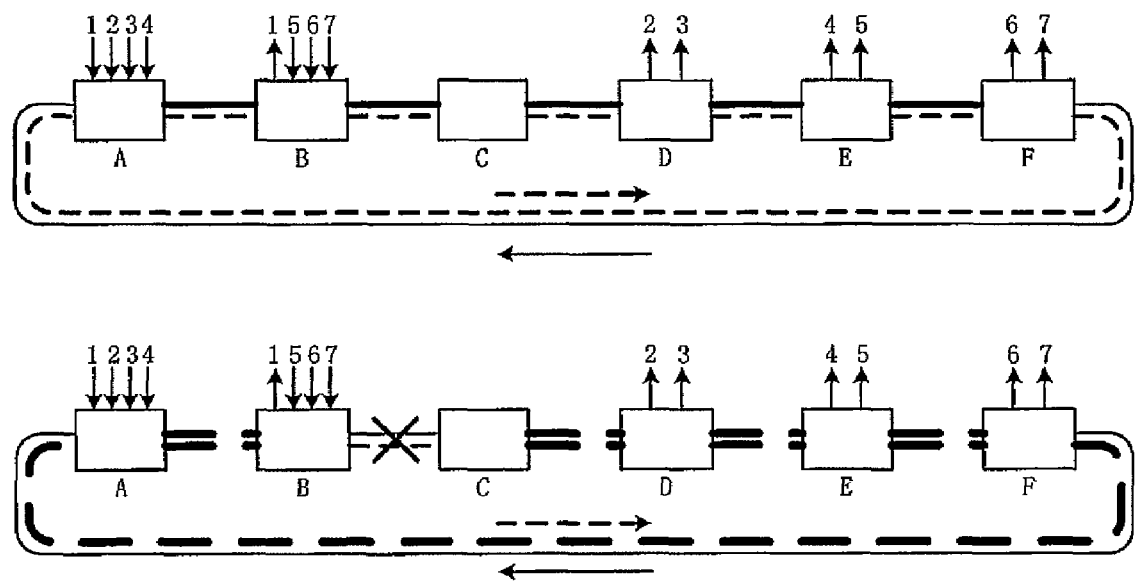
FIG. 11 is a schematic diagram showing the system of a ring network on which multiplex section protection is realized by a device for group optical channel shared protection according to an embodiment of the invention and the system of the ring network after a failure occurs.

FIG. 10 is a flow chart of the method for group optical channel shared protection according to a preferred embodiment of the invention.

First of all, in step 110, it is determined whether a service is affected by a failure, if yes, turn to step 120; otherwise, the process ends. Wherein, this step is performed when a failure occurs on the fiber, so that the affected service may be found and the subsequent protection processes may be performed.

In step 120, each node combines each affected optical wavelength whose source node is the current node on the working fiber into a group and switches it to a backup fiber. It should be noted that a node may be the source node of a plurality of affected optical wavelengths. In the invention, these affected optical wavelengths are combined into a group for a uniform Steer process.

Then, turn to step 130, in which each optical wavelength whose destination node is the current node on the backup fiber is combined into a group and switched to the working fiber. This is the so-called Copy operation. Because the drop of a service can only be performed on the working fiber, but the optical wavelength for carrying a service is delivered via the backup fiber to the destination node when switching process is performed in the invention, and in order to drop the service, the wavelength should be switched from the backup fiber to the working fiber. Therefore, the Copy operation should be carried out.

Then, turn to step 140, in which each optical wavelength whose destination node is not the current node on the backup fiber is combined into a group and then the group transparently passes through the current node. This is the so-called Pass Through operation.

Finally, turn to step 150, in which each backup wavelength transferred on the backup fiber is blocked or stripped off according to its source and destination information so as to prevent the optical wavelength from forming a loopback. This is the so-called Strip operation. In general, the node for performing the blocking or stripping process may be the destination node of the service, or it may be the source node of the service. Theoretically, the service may be blocked or stripped off on any node between the destination node and the source node. However, in practical applications, there may be no intermediate node between the destination node and the source node, so the blocking or stripping of the service is preferably performed on the destination node or the source node.

Those skilled in the art may appreciate that in the above steps, the process may be performed on a service node by a wavelength selective device in conjunction with an OADM.

It should be noted that although the technical solution according to the embodiments of the invention is put forward for realizing group optical channel shared protection, but those skilled in the art may appreciate that the technical solution according to the embodiments of the invention may also be used directly or with slight modification for realizing subband multiplex section protection.

Additional advantages and modifications will readily occur to those skilled in the art. Therefore, the invention in its broader aspects is not limited to the specific details and representative embodiments shown and described herein. Accordingly, various modifications and variations may be made without departing from the spirit or scope of the invention as defined by the appended claims and their equivalents.

The invention claimed is:

1. A method for group optical channel shared protection, which is used for a ring network constituted by connecting at least two nodes with two fibers with a relation of mutually working and backing up;
    wherein, each of the at least two nodes performs following steps when a failure occurs:
    combining affected optical wavelengths, whose source node is current node and is used for adding service signals of the affected optical wavelengths, on a working fiber into a first group, and switching the first group to a backup fiber;
    combining optical wavelengths, whose destination node is the current node and is used for dropping service signals of the optical wavelengths, on the backup fiber into a second group, and switching the second group to the working fiber; and
    combining optical wavelengths, whose destination node is not the current node, on the backup fiber into a third group, and making the third group transparently pass through the current node;
    wherein the method further comprises: blocking or stripping off each backup wavelength transferred on the backup fiber according to source and destination information of each backup wavelength, so as to prevent the backup wavelength from forming a loopback.

2. The method for group optical channel shared protection according to claim 1, wherein the two fibers with a relation of mutually working and backing up use different wavelengths as a working wavelength respectively, and each of the two fibers takes a wavelength channel, which has the same wavelength as the working wavelength of an opposite party, as a protection wavelength.

3. The method for group optical channel shared protection according to claim 2, wherein the working wavelength used respectively by the two fibers with a relation of mutually working and backing up comprises: odd wavelength, even wavelength, red band and blue band.

4. The method for group optical channel shared protection according to claim 1, wherein mutual switching between the working fiber and backup fiber may be a loopback switching or a cross switching.

5. The method for group optical channel shared protection according to claim 1, wherein each backup wavelength transferred on the backup fiber is blocked or stripped off by the source node or the destination node of the backup wavelength.

6. The method for group optical channel shared protection according to claim 1, wherein the backup wavelength is blocked or stripped off on a node adjacent to the failure.

7. A system for group optical channel shared protection, comprising a ring network constituted by connecting at least two nodes with a first fiber and a second fiber with a mutually working and backing up relation;
wherein, each of the at least two nodes is further adapted to combine affected optical wavelengths, whose source node is current node and is used for adding service signals of the affected optical wavelengths, on the working fiber into a first group and switch the first group to a backup fiber, combine optical wavelengths, whose destination node is the current node and is used for dropping service signals of the optical wavelengths, on the backup fiber into a second group and switch the second group to the working fiber, and combine optical wavelength, whose destination node is not the current node, on the backup fiber into a third group, and the third group transparently passes through the current node, when a failure occurs;
wherein the node is further adapted to block or strip off each backup wavelength transferred on the backup fiber according to source and destination information of the backup wavelength, so as to prevent the backup wavelength from forming a loopback.

8. The system for group optical channel shared protection according to claim 7, wherein the node for performing blocking or stripping according to the source and destination information of each backup wavelength is the source node or the destination node of the backup wavelength.

9. The system for group optical channel shared protection according to claim 7, wherein the backup wavelength is further blocked or stripped off on a node adjacent to a failed segment.

10. The system for group optical channel shared protection according to claim 7, wherein each node comprises:
at least two Optical Add Drop Multiplexers, which are connected to the first fiber and the second fiber respectively, for add and drop of a service signal on the fiber connected; and
at least four optical wavelength selective devices, wherein two optical wavelength selective devices are connected in series on the first fiber and the second fiber respectively, for blocking the backup wavelength selectively; and two ends of each of the other two optical wavelength selective devices are respectively connected to the first fiber and the second fiber, for selectively switching the optical wavelength on the first fiber to the second fiber or switching the optical wavelength on the second fiber to the first fiber respectively.

11. The system for group optical channel shared protection according to claim 10, wherein the optical wavelength selective device comprises: a wavelength blocker; or a combination of an optical demultiplexer, a tunable attenuator and an optical multiplexer; or a combination of an optical demultiplexer, an optical switch array and an optical multiplexer.

12. The system for group optical channel shared protection according to claim 11, wherein the optical wavelength selective device for switching is configured as in open state for affected optical wavelength group whose source node is a current node and working fiber is a failed fiber segment, for switching the optical wavelength to a backup fiber.

13. The system for group optical channel shared protection according to claim 11, wherein an optical wavelength selective device for switching on each node is configured as in open state for a backup wavelength group, whose destination node is a current node, on the backup fiber, for switching the backup wavelength group back to the working fiber, and dropping the service signal by the Optical Add Drop Multiplexer connected on the working fiber.

14. The system for group optical channel shared protection according to claim 1, wherein the optical wavelength selective device connected in series on the fiber on a node for blocking is configured as in blocked state for an optical wavelength group, whose source node or destination node is the current node, for preventing the backup wavelength from forming a loopback on the backup fiber.

15. The system for group optical channel shared protection according to claim 11, wherein the optical wavelength selective device connected in series on the fiber on the node for blocking is configured as in open state for an optical wavelength group, whose source node or destination node is not the current node, so that each optical wavelength, whose source node or destination node is not the current node, on the backup fiber transparently passes through the current node.

16. The system for group optical channel shared protection according to claim 10, wherein the optical wavelength selective device for switching is configured as in open state for affected optical wavelength group whose source node is a current node and working fiber is a failed fiber segment, for switching the optical wavelength to a backup fiber.

17. The system for group optical channel shared protection according to claim 10, wherein an optical wavelength selective device for switching on each node is configured as in open state for a backup wavelength group, whose destination node is a current node, on the backup fiber, for switching the backup wavelength group back to the working fiber, and dropping the service signal by the Optical Add Drop Multiplexer connected on the working fiber.

18. The system for group optical channel shared protection according to claim 10, wherein the optical wavelength selective device connected in series on the fiber on a node for blocking is configured as in blocked state for an optical wavelength group, whose source node or destination node is the current node, for preventing the backup wavelength from forming a loopback on the backup fiber.

19. The system for group optical channel shared protection according to claim 10, wherein the optical wavelength selective device connected in series on the fiber on the node for blocking is configured as in open state for an optical wavelength group, whose source node or destination node is not the current node, so that each optical wavelength, whose source node or destination node is not the current node, on the backup fiber transparently passes through the current node.

20. The system for group optical channel shared protection according to claim 10, wherein the system comprises a first, a second, a third and a fourth Optical Add Drop Multiplexer, wherein:
the first Optical Add Drop Multiplexer and the second Optical Add Drop Multiplexer are connected with the first fiber, the third Optical Add Drop Multiplexer and the fourth Optical Add Drop Multiplexer are connected with the second fiber;

the first Optical Add Drop Multiplexer is used for the drop of the service signal on the first fiber, the second Optical Add Drop Multiplexer is used for the add of the service signal on the first fiber, the third Optical Add Drop Multiplexer is used for the drop of the service signal on the second fiber, and the fourth Optical Add Drop Multiplexer is used for the add of the service signal on the second fiber.

21. The system for group optical channel shared protection according to claim 20, wherein the system comprises six optical wavelength selective devices, in which two optical wavelength selective devices are connected in series on the two fibers respectively, for blocking the backup wavelength selectively; and the two ends of each of the other four optical wavelength selective devices are connected to the first fiber and the second fiber respectively, for selectively switching the working optical wavelength on the first fiber to the second fiber, or switching the backup wavelength on the first fiber to the second fiber, or switching the working optical wavelength on the second fiber to the first fiber, or switching the backup wavelength on the second fiber to the first fiber, respectively.

22. The system for group optical channel shared protection according to claim 7, wherein each node comprises:
at least two Optical Add Drop Multiplexers, which are connected to the first fiber and the second fiber respectively, for the add and drop of the service signal on the fiber connected;
at least two optical wavelength selective devices, the two ends of each are connected to the first fiber and the second fiber respectively, for selectively switching the optical wavelength on the first fiber to the second fiber or switching the optical wavelength on the second fiber to the first fiber respectively; and
at least two optical switches, which are connected in series on the first fiber and the second fiber respectively, for forcing the east-oriented or west-oriented fiber to fail at the same time when a failure occurs on the fiber adjacent to the node.

23. The system for group optical channel shared protection according to claim 22, wherein the optical wavelength selective device for switching is configured as in open state for an affected optical wavelength group whose source node is the current node and working fiber is the failed fiber segment, for switching the optical wavelength to the backup fiber.

24. The system for group optical channel shared protection according to claim 22, wherein the optical wavelength selective device for switching on each node is configured as in open state for a backup wavelength group, whose destination node is the current node, on the backup fiber, for switching the backup wavelength group back to the working fiber, and dropping the service signal by the Optical Add Drop Multiplexer connected on the working fiber.

25. The system for group optical channel shared protection according to claim 22, wherein the node adjacent to a failed fiber segment prevents the backup wavelength from forming a loopback on the backup fiber by switching off the optical switch connected with the failed fiber segment.

26. The system for group optical channel shared protection according to claim 7, wherein the two fibers with a relation of mutually working and backing up use different wavelengths as the working wavelength respectively, and each of the two fibers takes the wavelength channel, which has the same wavelength as the working wavelength of the opposite party, as the protection wavelength.

27. The system for group optical channel shared protection according to claim 7, wherein the working wavelength used respectively by the two fibers with a relation of mutually working and backing up comprises: odd wavelength, even wavelength, red band and blue band.

28. A device for optical channel shared protection, which is used in a two-fiber OCh-SPRing comprised of two fibers and at least two nodes, wherein the device for optical channel shared protection comprises: at least two optical Add Drop multiplexing units, which are used for a first fiber and a second fiber respectively for add and drop of a service signal on the fiber; at least two optical wavelength selective devices, the two ends of each are connected to the first fiber and the second fiber respectively, for selectively switching an optical wavelength on the first fiber to the second fiber or switching an optical wavelength on the second fiber to the first fiber respectively;
wherein the optical wavelength selective device, for selectively switching the optical wavelength on the first fiber to the second fiber, is configured as in open state for the optical wavelength whose source node is current node and is used for adding the service signal of the optical wavelength when the first fiber is a failed fiber segment; and
the optical wavelength selective device, for selectively switching the optical wavelength on the second fiber to the first fiber, is configured as in open state for the optical wavelength whose destination node is current node and is used for dropping the service signal of the optical wavelength when the first fiber is the failed fiber segment;
wherein the device further comprises at least two optical switches, which are connected in series on the first fiber and the second fiber respectively, for forcing the east-oriented or west-oriented fiber to fail at the same time when a failure occurs on the fiber adjacent to the node.

29. The device for optical channel shared protection according to claim 28, wherein the node adjacent to a failed fiber segment prevents the backup wavelength from forming a loopback on the backup fiber by switching off the optical switch connected with the failed fiber segment.

30. The device for optical channel shared protection according to claim 28, wherein the optical wavelength selective device comprises: a wavelength blocker; or a combination of an optical demultiplexer, a tunable attenuator and an optical multiplexer; or a combination of an optical demultiplexer, an optical switch array and an optical multiplexer.

31. A device for optical channel shared protection, which is used in a two-fiber OCh-SPRing comprised of two fibers and at least two nodes, wherein the device for optical channel shared protection comprises: at least two optical Add Drop multiplexing units, which are used for a first fiber and a second fiber respectively for add and drop of a service signal on the fiber; at least two optical wavelength selective devices, the two ends of each are connected to the first fiber and the second fiber respectively, for selectively switching an optical wavelength on the first fiber to the second fiber or switching an optical wavelength on the second fiber to the first fiber respectively;
wherein the optical wavelength selective device, for selectively switching the optical wavelength on the first fiber to the second fiber, is configured as in open state for the optical wavelength whose source node is current node and is used for adding the service signal of the optical wavelength when the first fiber is a failed fiber segment; and
the optical wavelength selective device, for selectively switching the optical wavelength on the second fiber to the first fiber, is configured as in open state for the optical wavelength whose destination node is current node and is used for dropping the service signal of the optical wavelength when the first fiber is the failed fiber segment;

wherein the device further comprises at least two optical wavelength selective devices, two of which are connected in series on the first fiber and the second fiber respectively, for blocking the backup wavelength selectively.

32. The device for optical channel shared protection according to claim 1, wherein the optical wavelength selective device comprises: a wavelength blocker; or a combination of an optical demultiplexer, a tunable attenuator and an optical multiplexer; or a combination of an optical demultiplexer, an optical switch array and an optical multiplexer.

* * * * *

UNITED STATES PATENT AND TRADEMARK OFFICE
CERTIFICATE OF CORRECTION

PATENT NO. : 8,103,161 B2
APPLICATION NO. : 11/813143
DATED : January 24, 2012
INVENTOR(S) : Li It is certified that error appears in the above-identified patent and that said Letters Patent is hereby corrected as shown below:

In Col. 22, line 16, claim 14, delete "claim 1" and insert --claim 11--.
In Col. 26, line 2, claim 32, delete "claim 1" and insert --claim 29--.

Signed and Sealed this
Tenth Day of April, 2012

David J. Kappos
*Director of the United States Patent and Trademark Office*